United States Patent [19]

Jacobs et al.

[11] Patent Number: 5,200,489
[45] Date of Patent: Apr. 6, 1993

[54] WATER DISPERSIBLE POLYISOCYANATES

[75] Inventors: Patricia B. Jacobs, Pittsburgh; Terry A. Potter, Beaver, both of Pa.

[73] Assignee: Miles Inc., Pittsburgh, Pa.

[21] Appl. No.: 842,866

[22] Filed: Feb. 27, 1992

[51] Int. Cl.⁵ ............................................. C08G 18/30
[52] U.S. Cl. ..................................... 528/49; 524/591; 524/839
[58] Field of Search .................. 528/49; 524/591, 839; 252/182.2

[56] References Cited

U.S. PATENT DOCUMENTS

| | | | |
|---|---|---|---|
| 3,996,154 | 12/1976 | Johnson et al. | 252/312 |
| 4,433,095 | 2/1984 | Hombach et al. | 524/563 |
| 4,472,550 | 9/1984 | Reiff et al. | 524/589 |
| 4,663,377 | 5/1987 | Hombach et al. | 524/196 |
| 5,075,370 | 12/1991 | Kubitza et al. | 524/591 |

FOREIGN PATENT DOCUMENTS 1417618 12/1975 United Kingdom.
1444933 8/1976 United Kingdom.

*Primary Examiner*—Maurice J. Welsh
*Attorney, Agent, or Firm*—Joseph C. Gil; Thomas W. Roy

[57] ABSTRACT

The present invention is directed to a polyisocyanate composition which is dispersible in water, has an average NCO functionality of 2 to 6 and contains a) a polyisocyanate adduct prepared from 1,6-hexamethylene diisocyanate or a mixture of hexamethylene diisocyanate with up to 70% by weight, based on the weight of the diisocyanates, of another diisocyanate and b) at least 10% by weight, based on the weight of the polyisocyanate adduct, of an emulsifier which is based on the reaction product of i) a monohydroxy functional polyether wherein the ethylene oxide portion of the polyether has a molecular weight of 200 to 1000 and the polyether has a total molecular weight of 200 to 1500 with ii) either a polyisocyanate adduct which corresponds to component a) or another polyisocyanate.

The present invention is also directed to a composition which contains this polyisocyanate compositions and an aqueous resin containing isocyanate-reactive groups.

8 Claims, No Drawings

WATER DISPERSIBLE POLYISOCYANATES

BACKGROUND OF THE INVENTION

1. Field of the Invention

The present invention is directed to polyisocyanates which are based on hexamethylene diisocyanate, are liquid and have improved dispersibility.

2. Background of the Invention

Water dispersible polyisocyanates prepared from polyisocyanates having aromatically bound isocyanate groups are known and disclosed in U.S. Pat. No. 4,433,095. Water dispersible polyisocyanates prepared from polyisocyanates containing (cyclo)aliphatically bound isocyanate groups are known and have been disclosed in U.S. Pat. No. 4,663,377; German Offenlegungsschrift 3,829,587 (U.S. Ser. No. 07/395,849); and U.S. Ser. Nos. 07/644,180, 07/643,615 and 07/644,798. These polyisocyanates are generally rendered hydrophilic by reaction with a monohydroxy functional polyether based on ethylene oxide or a mixture of ethylene oxide and propylene oxide.

U.S. Pat. No. 4,472,550 is directed to the use of monohydroxy functional polyethers which are initiated with specific cyclic compounds for providing hydrophilicity to both polyisocyanates having aromatically bound isocyanate groups and polyisocyanates having (cyclo)aliphatically bound isocyanate groups.

Even though the monohydroxy functional polyethers are effective for rendering polyisocyanates having (cyclo)-aliphatically bound isocyanate groups water dispersible, it is often necessary to dissolve the polyisocyanate in an organic solvent in order to assist its dispersion in water. In addition, the stability of the dispersed polyisocyanates needs to be improved. Accordingly, there is a need to further improve the hydrophilicity of the polyisocyanates and either reduce or eliminate the need for the polyisocyanate to be dispersed in an organic solvent during the dispersion step.

Another difficulty of the prior art monohydroxy functional polyethers based exclusively on ethylene oxide is that these polyethers are solid and often result in a modified polyisocyanate which also is solid. Accordingly, prior to dispersing these modified polyisocyanates in water it is necessary to dissolve them in an organic solvent and add them to water in solution. While it is possible when using blocked polyisocyanates to remove the solvent after the polyisocyanates are dispersed in water, it is not possible to remove the solvent from unblocked polyisocyanate dispersions. Because the dispersed polyisocyanates have a limited pot-life, they cannot withstand the time or the elevated temperatures which are necessary to remove the solvent.

In an effort to liquify the solid polyethers and avoid the necessity of using organic solvents, the prior art references previously mentioned often use a monohydroxy functional polyether prepared from both ethylene oxide and propylene oxide. While such polyethers are liquid the presence of propylene oxide adds weight to the polyether and, thus, reduces the isocyanate content of the modified polyisocyanates. In addition, because propylene oxide is not hydrophilic like ethylene oxide, additional ethylene oxide is necessary to provide hydrophilicity to the propylene oxide, and this also reduces the isocyanate content of the modified polyisocyanates.

Accordingly, it is an object of the present invention to provide modified polyisocyanates based on hexamethylene diisocyanate which are liquid, do not require the use of organic solvents for dispersion in water and have improved hydrophilicity when compared to prior art liquid, modified polyisocyanates.

This object may be achieved in accordance with the present invention as described hereinafter by reacting a polyisocyanate adduct prepared from hexamethylene diisocyanate either alone or in admixture with other diisocyanates with a low molecular weight monohydroxy functional polyether prepared from ethylene oxide.

Even though U.S. Pat. No. 3,996,154 and British Patents 1,417,618 and 1,444,933 disclose the use of low molecular monohydroxy functional polyethers prepared from ethylene oxide for rendering polyisocyanates water dispersible. These references do not disclose polyisocyanate adducts prepared from hexamethylene diisocyanate as suitable polyisocyanates for modification with the polyethers. These references are primarily directed to the modification of polyisocyanates containing aromatically bound isocyanate groups such as toluene diisocyanate, diphenylmethane diisocyanate and polyphenyl polymethylene polyisocyanates. In addition, the examples set forth hereinafter demonstrate that the improvements in hydrophilicity obtained for the claimed polyisocyanate compositions are not obtained when using polyphenyl polymethylene polyisocyanates.

SUMMARY OF THE INVENTION

The present invention is directed to a polyisocyanate composition which is dispersible in water, has an average NCO functionality of 2 to 6 and contains a) a polyisocyanate adduct prepared from 1,6-hexamethylene diisocyanate or a mixture of hexamethylene diisocyanate with up to 70% by weight, based on the weight of the diisocyanates, of another diisocyanate and b) at least 10% by weight, based on the weight of the polyisocyanate adduct, of an emulsifier which is based on the reaction product of
i) a monohydroxy functional polyether wherein the ethylene oxide portion of the polyether has a molecular weight of 200 to 1000 and the polyether has a total molecular weight of 200 to 1500 with
ii) either a polyisocyanate adduct which corresponds to component a) or another polyisocyanate.

The present invention is also directed to a composition which contains this polyisocyanate composition and an aqueous resin containing isocyanate-reactive groups.

DETAILED DESCRIPTION OF THE INVENTION

The polyisocyanate compositions according to the present invention have an average functionality of at least 2, preferably 2.5. The upper limit for the functionality is 6, preferably 4.5.

Suitable polyisocyanate adducts for use as component a) in accordance with the present invention include those containing isocyanurate, uretdione, biuret, urethane, allophanate, carbodiimide or oxadiazinetrione groups. Processes for the preparation of polyisocyanate adducts containing these groups are known and described in U.S. Pat. Nos. 4,518,522 and 4,663,377, the disclosures of which are incorporated by reference. Preferred polyisocyanate adducts according to the present invention are those containing isocyanurate groups, mixtures of isocyanurate groups and allophanate groups (e.g., those described in U.S. Ser. Nos. 07/644,174 and 07/733,549 and 07/733,566, the disclosures of which are herein incorporated by reference) and mixtures of isocyanurate groups and uretdione groups.

The polyisocyanate adducts are prepared from 1,6-hexamethylene diisocyanate. However, it is also possible in accordance with the present invention to prepare the polyisocyanate adducts from 1,6-hexamethylene diisocyanate in admixture with up to 70%, preferably up to 50%, based on the total weight of diisocyanates, of an additional diisocyanate, preferably a diisocyanate containing (cyclo)aliphatically bound isocyanate groups. Suitable diisocyanates of this type have been disclosed in the above-mentioned references which have previously been incorporated by reference. Preferred diisocyanates include 1-isocyanato-3,3,5-trimethyl-5-isocyanatomethyl-cyclohexane (isophorone diisocyanate or IPDI) and bis-(4-isocyanatocyclohexyl)-methane.

Suitable emulsifiers include the reaction products of polyisocyanates with monohydroxy functional polyethers. Examples of suitable polyisocyanates include the polyisocyanate adducts previously set forth and, in addition, other polyisocyanates, preferably polyisocyanates containing (cyclo)aliphatically bound isocyanate groups. These other polyisocyanates include polyisocyanate adducts prepared from diisocyanates other than 1,6-hexamethylene and also monomeric polyisocyanates. These other polyisocyanate adducts and monomeric polyisocyanates have been described in the references which have previously been incorporated by reference.

Suitable monohydroxy functional polyethers are those wherein the ethylene oxide portion has a minimum molecular weight of 200, preferably 250 and more preferably 300. The upper limit for the molecular weight of the ethylene oxide portion is 1000, preferably 950, more preferably 900 and most preferably 800. The minimum molecular weight for the entire polyether is 200, preferably 250 and more preferably 300. The upper limit for the molecular weight of the polyether is 1500, preferably 1200, more preferably 1000 and most preferably is the same as the maximum molecular weight of the ethylene oxide portion. In other words the most preferred polyethers are based exclusively on ethylene oxide.

The polyethers are prepared by reacting starter molecules with ethylene oxide or optionally with a mixture of ethylene oxide and another alkylene oxide, preferably propylene oxide or butylene oxide and more preferably propylene oxide. The presence of these other alkylene oxides does not increase the hydrophilicity of the polyethers and, therefore, their use is not preferred. However, polyethers based exclusively on ethylene oxide and having ethylene oxide molecular weights at the upper end of the previously discussed ranges may be crystalline. Small amounts of the other alkylene oxides may be incorporated into these polyethers in order to reduce their tendency to crystallize. However, it is more preferred to reduce the tendency to crystallize by reducing the molecular weight of the polyether.

Suitable starter molecules for the production of the monofunctional polyethers include monoalcohols containing 1 to 12 carbon atoms, preferably 1 to 4 carbon atoms, such as methanol, ethanol, propanol or butanol, cyclohexanol, 3-methyl-3-hydroxymethyl-oxetane and phenol. Additional cyclic starter molecules are set forth in U.S. Pat. No. 4,472,550, the disclosure of which in herein incorporated by reference.

The production of the emulsifiers takes place by reacting the aliphatic polyisocyanates with the monohydroxy functional polyethers at a molar ratio of at least 1:1, preferably 2:1 to 1000:1. The emulsifiers can either be produced in a separate step and then mixed with polyisocyanate a) to form the composition of the present invention, or they can be produced in situ. In this latter method the polyisocyanate is mixed with a quantity of the monohydroxy functional polyether such that the composition according to the invention is produced in situ, i.e., it contains unmodified polyisocyanate (component a) and also emulsifiers (component b). If the emulsifiers are produced in a separate step the starting materials are reacted at an NCO/OH equivalent ratio of 2:1 to 6:1. If the emulsifiers are produced in situ, i.e., if the polyisocyanate compositions according to the inventions are produced in a one step process, a higher excess of isocyanate groups within the above-mentioned range can be used.

The quantity of the emulsifier which is mixed with the polyisocyanate or the quantity of monohydroxy functional polyether which is added to the polyisocyanate to prepare the polyisocyanate compositions in situ is calculated such that the polyisocyanate compositions contain a lower limit of at least 10% by weight, preferably at least 12% by weight of ethylene oxide units arranged in polyether chains. The upper limit is not critical, but is preferably 20% by weight, more preferably 15% by weight, of ethylene oxide units arranged in polyether chains. The production of the emulsifiers or the production of the polyisocyanate compositions in situ generally takes place at a moderately elevated temperature of 50° to 130° C.

In order to reduce the viscosity of the polyisocyanate preparations, small quantities, i.e., about 1 to 10% by weight, based on the solvent-free polyisocyanate composition, of an organic solvent such as ethylacetate, acetone or methylketone can be added to the compositions before they are used according to the invention. However, it is preferred not to use any organic solvents in the polyisocyanate composition of the present invention. It is also possible to process the polyisocyanate compositions according to the invention in the form of aqueous dispersions preferably having a solids content of 10 to 85% by weight. The production of these dispersions and emulsions takes place shortly before their use according to the invention by mixing the polyisocyanate compositions with water.

The polyisocyanate compositions are particularly suitable as crosslinking agents for aqueous resins containing isocyanate-reactive groups and preferably having a solids content of 10 to 65% by weight, more preferably 20 to 60% by weight. For the purposes of the present invention urethane and urea groups of aqueous polyurethane and/or polyurea dispersions are considered to be isocyanate-reactive groups since they are capable of reacting with isocyanate groups at elevated temperatures. The polyisocyanate compositions are generally added to the aqueous resins in an amount sufficient provide an equivalent ratio of isocyanate groups to isocyanate-reactive groups of at least 1:1, preferably at least 1.5:1.

Examples of these aqueous resins include natural latex, aqueous dispersions of homo or copolymers of olefinically unsaturated monomers, water dispersible polyhydroxyl compounds (including those containing urethane groups) and the known aqueous polyurethane dispersions. The dispersions may contain known auxiliaries and additives.

Suitable dispersions of homo or copolymers of olefinically unsaturated monomers include known dispersions of homo or copolymers based on vinyl esters of carboxylic acids having 2 to 18, preferably 2 to 4 carbon atoms such as vinyl acetate, optionally with up to about 70% by weight, based on the total quantity of olefinically unsaturated monomers, of other olefinically unsaturated monomers and/or homo or copolymers of (meth)acrylic acid esters of alcohols having 1 to 18, preferably 1 to 4 carbon atoms. Examples include (meth)acrylic acid or the methyl, ethyl, propyl, hydroxyethyl or hydroxypropyl esters thereof, optionally together with up to about 70% by weight of other olefinically unsaturated monomers, e.g., butadiene-styrene copolymers having a butadiene content of about 20 to 60% by weight; other diene-polymers or -copolymers such as polybutadiene or mixed polymers of butadiene with other olefinically unsaturated monomers such as styrene, acrylonitrile and/or methacrylonitrile; or aqueous dispersions of polymers or copolymers of 2-chloro-butadiene-1,3 having a chlorine content of from about 30 to 40% by weight, particularly a chlorine content of about 36% by weight, optionally with other olefinically unsaturated monomers of the type named above by way of example.

Suitable aqueous acrylic resins, water dispersible polyhydroxyl compounds and polyurethane dispersions and additives and auxiliaries which may be included therein are known and described, for example, in U.S. Pat. No. 3,479,310, 4,108,814, 4,028,313, 4,092,286, 4,190,566, the disclosures of which are herein incorporated by reference, and in U.S. Ser. Nos. 07/395,849, 07/644,180, 07/643,615 and 07/644,798, the disclosures of which are herein incorporated by reference.

content of 21.6% by weight, a content of monomeric diisocyanate of <0.2%, a viscosity at 20° C. of 3000 mPa.s and an average isocyanate functionality of about 3.5.

Polyisocyanate II—an aniline/formaldehyde condensation product containing 4,4'-diphenylmethane diisocyanate and about 50% of higher functionality homologs, having an NCO content of about 31.5% and a viscosity at 25° C. of 200 mPa.s.

Modified polyisocyanates were prepared by reacting Polyisocyanate I or Polyisocyanate II with monofunctional polyethers having the molecular weights set forth in the following Table. All of the monofunctional polyethers were prepared by ethoxylating methanol except for the polyether having a molecular weight of 840 which was initiated with glycerine dimethyl ketal. The amount of monofunctional polyether reacted with the polyisocyanate in weight percent, based on the weight of the polyisocyanate, is set forth in the Table. The reaction was carried out under nitrogen and with stirring until the theoretical isocyanate content was obtained, which generally occurred in 2 to 3 hours. When the reaction was complete, the reaction product was cooled and stored under dry nitrogen.

The test for water dispersibility was carried out as follows. 1.0 gram of the modified polyisocyanate was mixed by vigorous shaking in a test tube with 19.0 grams of distilled water. The dispersed polyisocyanate was then poured into a centrifuge tube which was weighed and then centrifuged at 2000-2500 rpm for 10 minutes. After centrifugation the water, which still contained dispersed solids, was poured off and the tube containing the residue was weighed. The weight of the residue was determined by difference and is set forth in the following Table. Some water was retained with the residue; the greater the residue, the greater the water retained. This explains the residue weights of greater than 1 gram. In addition, this water retention increased the variability of the results, but only for the less hydrophilic polyisocyanates.

| Polyether MW | Polyisocyanate I % Modification | | | | | | | Polyisocyanate II % Modification | | | |
|---|---|---|---|---|---|---|---|---|---|---|---|
| | 4 | 8 | 10 | 12 | 12.5 | 15 | 20 | 8 | 12 | 15 | 20 |
| 120 | — | — | — | 0.9* | — | — | — | — | — | — | — |
| 287 | 1.15 | 0.80 | 0.58 | 0.35 | 0.23 | 0.13 | 0.60 | 1.37 | 1.64 | 1.28 | 0.60 |
| 350 | — | — | — | 0.12 | — | — | — | — | — | — | — |
| 464 | 1.32 | 1.06 | — | 0.17 | — | — | — | 1.00 | 0.93 | — | — |
| 550 | — | — | 0.41 | — | 0.10 | 0.05 | 0.05 | — | — | 0.84 | 0.42 |
| 750 | 1.50 | 1.16 | 0.27 | 0.29 | 0.09 | 0.08 | 0.06 | 1.09 | 1.12 | 0.85 | 0.70 |
| 825 | — | — | —.80 | — | 0.34 | 0.16 | 0.07 | — | — | — | — |
| 840 | 1.33 | 1.12 | — | 0.75 | — | — | — | 1.27 | 1.19 | — | — |
| 900 | — | — | 1.05 | 0.28 | 0.73 | 0.28 | 0.24 | — | — | 0.98 | 0.88 |
| 954 | — | — | 1.18 | — | 0.83 | 0.33 | 0.44 | — | — | — | — |
| 1040 | 1.23 | — | 1.37 | 1.57 | 1.49 | 1.56 | 1.66 | 1.55 | 1.21 | 0.92 | 1.07 |

*The polyisocyanate modified with the 120 MW material did not disperse at all. It stuck to the glass of the test tube and thus not all of it was transferred to the centrifuge tube, resulting in an artificially low value for this example.

The invention is further illustrated but is not intended to be limited by the following examples in which all parts and percentages are by weight unless otherwise specified.

EXAMPLES

Polyisocyanate I—an isocyanurate group-containing polyisocyanate prepared by trimerizing a portion of the isocyanate groups of 1,6-hexamethylene diisocyanate; containing tris-(6-isocyanatohexyl)-isocyanurate and higher homologs thereof; and having an isocyanate The results of the water dispersibility testing demonstrate that a significant improvement in water dispersibility can be attained depending upon the polyisocyanate starting material, the molecular weight of the polyether and the percent modification. When polyisocyanate I was modified with greater than 10% by weight of monohydroxyl polyethers having molecular weights from 200 to 1000, a substantial improvement in dispersion stability was obtained. However, it is apparent that this improvement is also dependent upon the molecular weight of the polyether, i.e., when polyisocyanate I was modified with the same amount of polyethers having molecular weights of 120 and 1040, the improvement in dispersibility was not obtained.

When polyisocyanate I was modified with the monofunctional polyethers at modification levels of 4 weight percent and 8 weight percent, no improvement in water dispersibility was obtained. This demonstrates that amounts in excess of 10 weight percent are necessary to obtain improvements in water dispersibility.

The tests conducted with polyisocyanate II demonstrate that the improvement in water dispersibility is also dependent upon the particular polyisocyanate which is used as the starting material. When the methylene bridged polyphenyl polyisocyanates exemplified by British Patent 1,417,618 were modified with the same amounts of the same polyisocyanates used to modify polyisocyanate I, no improvement in water dispersibility was obtained.

Therefore, the results set forth in the preceding Table demonstrate that the improvements obtained in accordance with the present invention are both significant and unexpected.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyisocyanate composition which is dispersible in water, has an average NCO functionality of 2 to 6 and comprises
   a) a polyisocyanate adduct prepared from 1,6-hexamethylene diisocyanate or a mixture of hexamethylene diisocyanate with up to 70% by weight, based on the weight of the diisocyanates, of another diisocyanate and
   b) an emulsifier which comprises the reaction product of
      i) a monohydroxy functional polyether wherein the ethylene oxide portion of the polyether has a molecular weight of 200 to 1000 and the polyether has a total molecular weight of 200 to 1500 with
      ii) either a polyisocyanate adduct which corresponds to component a) or another polyisocyanate,
   wherein said emulsifier is present in an amount sufficient to provide an ethylene oxide content of at least 10% by weight, based on the weight of the polyisocyanate composition.

2. The composition of claim 1 wherein said polyisocyanate adduct contains isocyanurate groups.

3. A polyisocyanate composition which is dispersible in water, has an average NCO functionality of 2 to 6 and comprises
   a) a polyisocyanate adduct prepared from 1,6-hexamethylene diisocyanate or a mixture of hexamethylene diisocyanate with up to 70% by weight, based on the weight of the diisocyanates, of another diisocyanate having (cyclo)aliphatically bound isocyanate groups and
   b) an emulsifier which comprises the reaction product of
      i) a monohydroxy functional polyether wherein the ethylene oxide portion of the polyether has a molecular weight of 200 to 1000 and the polyether has a total molecular weight of 200 to 1500 with
      ii) either a polyisocyanate adduct which corresponds to component a) or another polyisocyanate having (cyclo)aliphatically bound isocyanate groups,
   wherein said emulsifier is present in an amount sufficient to provide an ethylene oxide content of at least 10% by weight, based on the weight of the polyisocyanate composition.

4. The composition of claim 3 wherein said polyisocyanate adduct contains isocyanurate groups.

5. A composition which comprises
   I) a polyisocyanate composition which is dispersible in water, has an average NCO functionality of 2 to 6 and comprises
      a) a polyisocyanate adduct prepared from 1,6-hexamethylene diisocyanate or a mixture of hexamethylene diisocyanate with up to 70% by weight, based on the weight of the diisocyanates, of another diisocyanate and
      b) an emulsifier which comprises the reaction product of
         i) a monohydroxy functional polyether wherein the ethylene oxide portion of the polyether has a molecular weight of 200 to 1000 and the polyether has a total molecular weight of 200 to 1500 with
         ii) either a polyisocyanate adduct which corresponds to component a) or another polyisocyanate,
      wherein said emulsifier is present in an amount sufficient to provide an ethylene oxide content of at least 10% by weight, based on the weight of the polyisocyanate composition, and
   II) an aqueous polymer resin which contains isocyanate-reactive groups.

6. The composition of claim 5 wherein said polyisocyanate adduct contains isocyanurate groups.

7. The composition of claim 5 wherein said aqueous polymer resin comprises an aqueous polyurethane resin.

8. The composition of claim 6 wherein said aqueous polymer resin comprises an aqueous polyurethane resin.

* * * * *